B. MILEWSKI.
TROLLEY WHEEL MOUNT.
APPLICATION FILED MAY 14, 1914
1,115,084.
Patented Oct. 27, 1914.
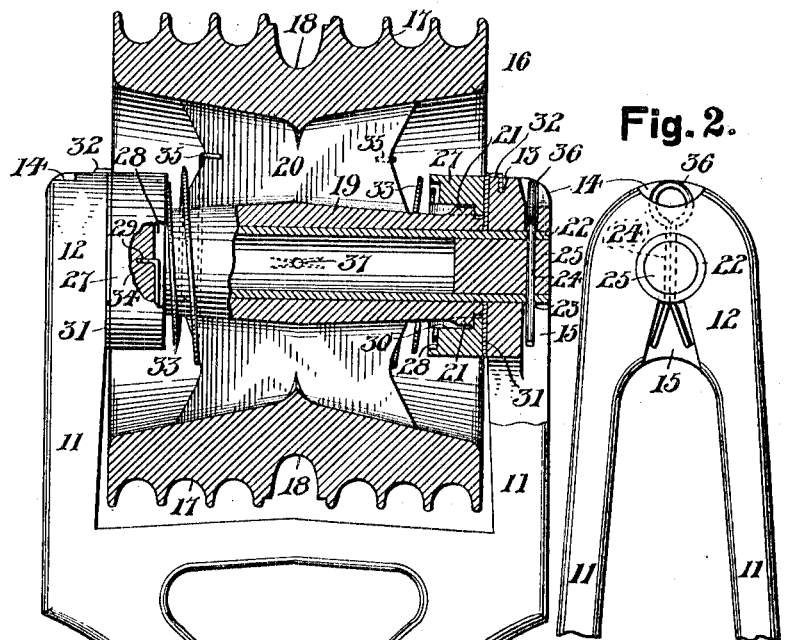
Fig. 1.
Fig. 2.
Fig. 3.
Fig. 4.
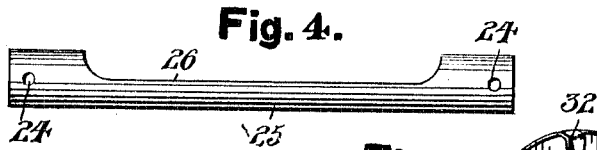
Fig. 5.
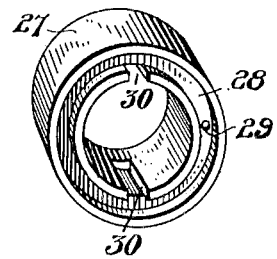
Fig. 6.
Fig. 7.
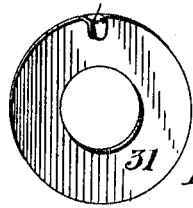
Witnesses
G. F. Torosiewicz
Milton E. Lowry.
Inventor
Bronislaw Milewski
By A. M. Wilson
Attorney

UNITED STATES PATENT OFFICE.

BRONISLAW MILEWSKI, OF KENT, OHIO.

TROLLEY-WHEEL MOUNT.

1,115,084.

Specification of Letters Patent. Patented Oct. 27, 1914.

Application filed May 14, 1914. Serial No. 838,508.

*To all whom it may concern:*

Be it known that I, BRONISLAW MILEWSKI, a subject of the Czar of Russia, residing at Kent, in the county of Portage and State of Ohio, have invented certain new and useful Improvements in Trolley-Wheel Mounts, of which the following is a specification.

This invention relates to certain new and useful improvements in trolley wheel mounts.

The primary object of the invention is to provide a mount of peculiar construction for trolley wheels, provided with removable members and disks, while the bearing is of hollow construction and is adapted to carry a lubricant for the reduction of friction.

A further object of the invention is to construct a trolley wheel having few working parts simple in construction which may be easily renewed when the same become broken or otherwise injured.

With the above and other objects in view that will appear as the nature of the invention is better understood, the same consists in the novel construction, combination and arrangement of parts to be hereinafter described and then claimed, reference being had to the accompanying drawing by like characters designating corresponding parts throughout the several views.

In the drawing which shows a preferred embodiment of my invention Figure 1 is a front elevational view of a trolley head, with the trolley wheel and bearing shown partly in section. Fig. 2 is an end elevational view of a portion of the head. Fig. 3 is a side elevational view of the wheel bearing removed from the head, and partly shown in section. Fig. 4 is a side elevational view of the inner section of the hollow bearing removed. Fig. 5 is a perspective view of one of the tubular members of the hub removed. Fig. 6 is a view of the spring removed from the head, and Fig. 7 is a perspective view of one of the disks employed.

Referring more in detail to the accompanying drawing, the reference numeral 10 denotes a trolley pole of usual construction provided with a wheel carrying head, bifurcated as at 11 and joined at its outer ends as at 12. The outer ends 12 of the head constitute supports for the wheel bearing, the same being provided with alined openings, and having their outer ends recessed as at 13 and further provided with an opening 14, while the sides of the ends 12 are cut away as at 15.

Mounted between the outer ends 12 of the trolley head is the wheel 16, the periphery of which is spirally grooved as at 17 to guide the trolley wire into the center groove 18. The wheel 16 is connected to the hollow hub 19 by the webs 20, the outer ends of the hub being provided with lugs or projections 21 for purposes to be later described.

The bearing for the wheel 16 consists of a tubular member 22 provided at each end thereof with alined openings 23 that are adapted to register with openings 24 in the lubricant cartridge 25, one side face of the cartridge being cut away intermediate its ends as at 26 and adapted to be filled with a suitable lubricant, while the ends of the cartridge snugly engage the inner face of the tubular member 22. At the ends of the trolley hub, I provide conductors 27, comprising short tubular members having plane outer faces, while the inner faces are annularly grooved as at 28, the bottom wall of each groove being provided with an opening 29. Guides 30 are cut in the members 27 and are caused to register with the lugs 21 on the hub when the parts are assembled so that the hub and end cap move in unison. A disk 31 is mounted on the tubular member 22 intermediate the end members 27 and the outer end 12 of the trolley head, and carries a bent lug 32 that is adapted to be received in the recess 13 to prevent relative movement thereof with respect to the end members. A coil spring 33 is mounted on each end of the hub 19 and has one end 34 received in the opening 29 in the end member while the other end is bent to provide a hook 35 that engages one of the wheel webs 20, as clearly shown in Fig. 1. When the parts are assembled as shown in Fig. 1, a cotter pin 36 is introduced into the opening 14 in the outer end 12 of the trolley head, and passes through the registering openings 23 and 24 in the tubular member 22 and lubricant cartridge 25 while the inner ends thereof are bent and received in the cut-away portion 15 of the trolley head.

In assembling the parts, the disk 31 has its bent lug 32 received within the recess 13, after which the trolley wheel 16 with the members 27 and springs 33 upon its hub 19 is alined with the openings in the outer ends of the arms. In this position the tubular member 22 carrying the lubricant cartridge 25 is passed through the registering openings in the hollow hub and the outer end of the arms until the openings 23 and 24 register, with the cotter pin 36 passed therethrough. It is to be noted that the members 27 and disks 31 may be readily renewed when broken or otherwise injured. The springs 33 perform the function of forcing the members 27 in an outward direction. The tubular member 22 is provided intermediate its ends with an opening 37 which will permit the flow of the lubricant in the cartridge 25 on to the inner face of the hollow tube 19. The lubricant in the cartridge 25 is preferably of cake-form, but has a tendency to melt by the heat from the friction of the moving parts.

While I have shown and described the preferred embodiment of my invention, I do not wish to confine myself thereto, as various forms, modifications and arrangements of the parts as shown may be had without departing from the spirit and scope of the invention as claimed.

I claim:—

The combination with a trolley-head and the hollow hub of a trolley wheel, of tubular members secured one on each end of the hub to revolve therewith, and having its outer face plane and its inner face formed with an annular groove, a hub bearing disks on the hub-bearing between said tubular members and the ends of the trolley-head, coil springs surrounding the ends of the hub and adapted to extend into the grooves of said tubular members, said springs being secured at one end to the trolley wheel and at the opposite end to said tubular members.

In testimony whereof I affix my signature in presence of two witnesses.

BRONISLAW MILEWSKI.

Witnesses:
WM. MIECHOWSKI,
EZRA FOWLER.

Copies of this patent may be obtained for five cents each, by addressing the "Commissioner of Patents. Washington, D. C."